United States Patent
Nica et al.

(10) Patent No.: US 9,298,771 B2
(45) Date of Patent: Mar. 29, 2016

(54) RESOURCE ESTIMATION FOR A QUERY OPTIMIZATION PROCESS

(71) Applicants: Anisoara Nica, Waterloo (CA); Stephen Chou, Waterloo (CA)

(72) Inventors: Anisoara Nica, Waterloo (CA); Stephen Chou, Waterloo (CA)

(73) Assignee: IAS Solutions, Inc., Dublin, CA (US)

( * ) Notice: Subject to any disclaimer, the term of this patent is extended or adjusted under 35 U.S.C. 154(b) by 503 days.

(21) Appl. No.: 13/754,596

(22) Filed: Jan. 30, 2013

(65) Prior Publication Data

US 2014/0214798 A1  Jul. 31, 2014

(51) Int. Cl.
*G06F 7/00* (2006.01)
*G06F 17/30* (2006.01)

(52) U.S. Cl.
CPC ................... *G06F 17/30463* (2013.01)

(58) Field of Classification Search
CPC .................................................. G06F 17/30463
USPC .................................................. 707/718, 713
See application file for complete search history.

(56) References Cited

U.S. PATENT DOCUMENTS

| | | | |
|---|---|---|---|
| 5,091,852 A | 2/1992 | Tsuchida et al. | |
| 5,666,528 A | 9/1997 | Thai | |
| 5,668,987 A | 9/1997 | Schneider | |
| 5,812,996 A | 9/1998 | Rubin et al. | |
| 5,819,255 A | 10/1998 | Celis et al. | |
| 5,822,749 A | 10/1998 | Agarwal | |
| 6,341,281 B1 | 1/2002 | MacNicol et al. | |
| 6,356,889 B1 * | 3/2002 | Lohman et al. | |
| 7,184,998 B2 * | 2/2007 | Nica | |
| 7,356,524 B2 | 4/2008 | Zurek et al. | |
| 7,805,441 B2 | 9/2010 | Madhavan et al. | |
| 8,126,870 B2 | 2/2012 | Chowdhuri et al. | |
| 8,161,046 B2 | 4/2012 | Hadjieleftheriou et al. | |
| 8,732,163 B2 | 5/2014 | Halasipuram et al. | |
| 2003/0217047 A1 | 11/2003 | Marchisio | |
| 2010/0121839 A1 | 5/2010 | Meyer et al. | |
| 2010/0250518 A1 * | 9/2010 | Bruno et al. | 707/718 |
| 2012/0130988 A1 * | 5/2012 | Nica et al. | 707/718 |
| 2014/0122452 A1 | 5/2014 | Faerber et al. | |
| 2014/0214798 A1 * | 7/2014 | Nica et al. | 707/718 |

OTHER PUBLICATIONS

Kulik et al., Conference ICL2009 Sep. 23-25, 2009 Villach, Austria, pp. 364-367.*

* cited by examiner

*Primary Examiner* — Cheyne D Ly
(74) *Attorney, Agent, or Firm* — Sterne, Kessler, Goldstein & Fox P.L.L.C.

(57) ABSTRACT

Disclosed herein are system, method, and computer program product embodiments for performing resource estimation for query optimization. An embodiment operates by generating a subplan for which an optimization process may be invoked, predicting performance and resource consumption for optimizing the subplan by measuring similarity between a hypergraph of the subplan and one or more etalon queries having known performance and resource consumption properties, selecting an algorithm for optimizing the subplan from a plurality of optimization algorithms based on the performance and resource consumption properties, and generating an optimized access plan using the selected algorithm.

15 Claims, 4 Drawing Sheets

RESOURCE ESTIMATION FOR A QUERY OPTIMIZATION PROCESS

BACKGROUND

Database management systems ("DBMS") are increasingly expected to perform at high levels of reliability, performance, and efficiency on a growing range of platforms, from server-class installations to mobile devices. Such platforms are diverse and varied in terms of available resources and capabilities, such as computing power and available memory. Query optimization is an important process, whose resource consumption and performance may depend on several factors. Query optimizers may need to adapt to the highly diverse environments of the platforms and environments on which DBMSs execute, such as platforms and environments characterized by mixed workloads and limited correlation between query complexity, execution time, and database size.

BRIEF DESCRIPTION OF THE DRAWINGS

The accompanying drawings are incorporated herein and form a part of the specification.

In the drawings, like reference numbers generally indicate identical or similar elements. Additionally, generally, the leftmost digit(s) of a reference number identifies the drawing in which the reference number first appears.

DETAILED DESCRIPTION

Provided herein are system, method and/or computer program product embodiments, and/or combinations and sub-combinations thereof, for performing resource estimation for query optimization.

(A) Query Optimization Techniques and Algorithm Selection

Figure 1:
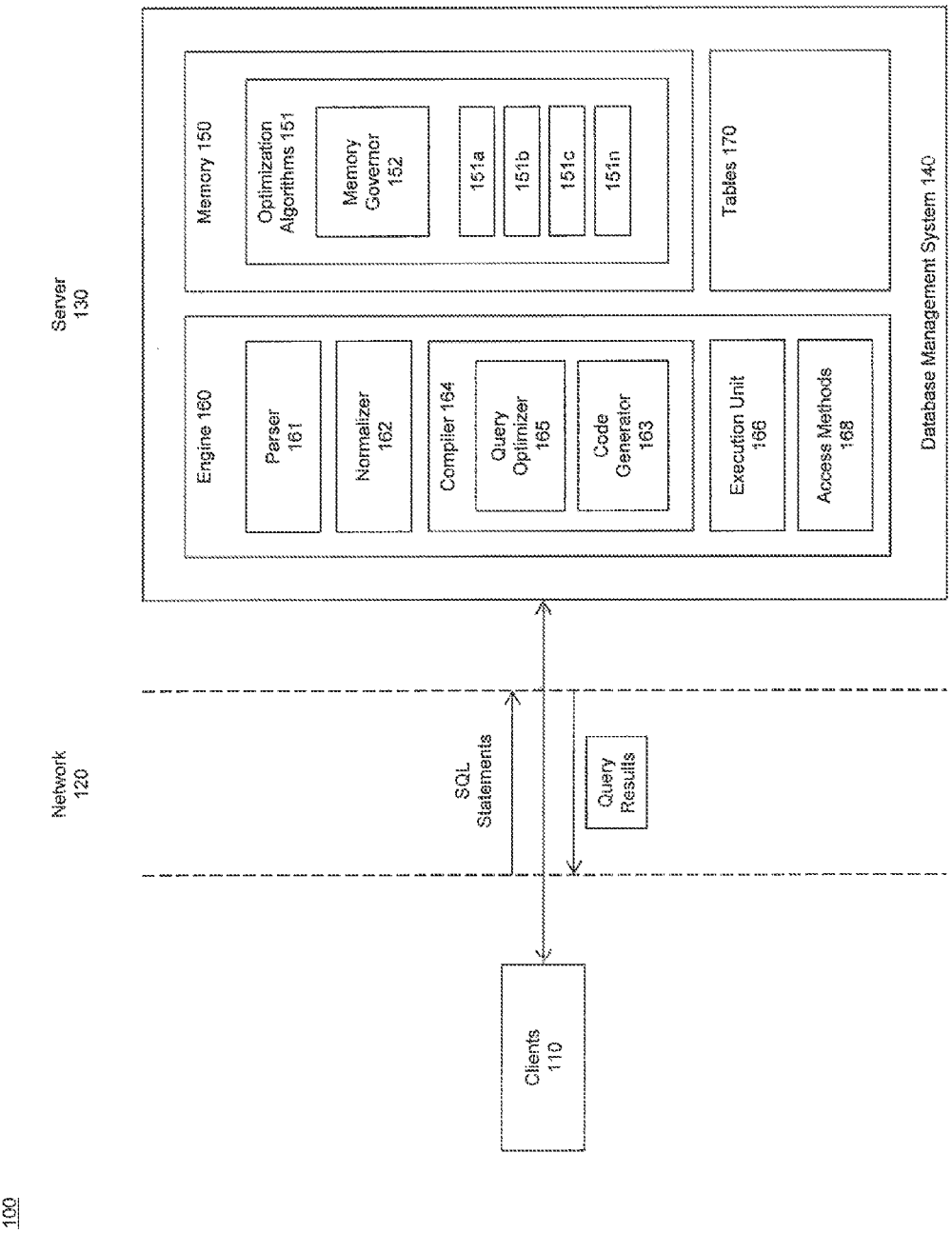
FIG. 1 is a block diagram of a database management system that includes a query optimizer, according to an example embodiment.

FIG. 1 is an example database computing environment 100 including a network 120. A client 110 is operable to communicate over network 120 with a database server 130 and DBMS 140. Database server 130 may comprise a server and/or database machine which operates alone or in combination with hardware and/or software coupled to a CPU and/or a network 120 using a client-server model. Although client 110 is represented as a separate physical machine from DBMS 140, this is by way of example not of limitation. Client 110 may occupy the same physical system as DBMS 140. Client 110 may also be a software application which has access to DBMS 140. In an example embodiment, client 110 is a human user who through use of a computing device is requesting access to DBMS 140. As used throughout herein, the terms "client" and "user" are used interchangeably to refer to any form or combination of hardware, software, or human requestor accessing DBMS 140 either manually or automatically, such as client 110.

In an example embodiment, DBMS 140 receives a query from client 110. A query is used to request, modify, append, or otherwise manipulate information stored in one or more database tables 170. A query is presented to DBMS 140 by client 110 using syntax which conforms to a query language. By way of a non-limiting example embodiment, the query language is Structured Query Language ("SQL"). However, a query may be defined and/or stated in any other suitable language. DBMS 140 interprets a query in accordance with the query language and generates one or more requests to retrieve data from tables 170 using an engine 160 configured to parse, normalize, compile, and execute queries.

In an example embodiment, engine 160 comprises a parser 161, a normalizer 162, a compiler 164, an execution unit 166, and access methods 168.

In an example embodiment, after DBMS 140 receives a query from client 110, the query is parsed by the parser 161. In an embodiment, parser 161 converts a query into a binary tree data structure, although other kinds of data structures may be used. Such tree data structures represent the query in a format that is convenient for engine 160.

In an example embodiment, parser 161 passes the query to normalizer 162. The function of normalizer 162 is to normalize the parsed query. Normalizer 162 eliminates redundant data and performs error checking on the parsed query, such as, for example, by confirming that references and names in the query conform to those in tables 170 and that relationships among tables as described by the query are valid. Normalizer 162 passes the normalized query to a compiler 164 that includes query optimizer 165. Query optimizer 165 optimizes the query. In an example embodiment, query optimizer 165 determines an approach and/or cost-based analysis by which to optimally manipulate information stored in tables 170 in accordance with the query semantics. An optimized approach is an access plan 218 (see the example of FIG. 2, which shows a portion of FIG. 1 in greater detail).

In an example embodiment, query optimizer 165 is configured to determine a best or optimal access plan 218. The terms "best" and "optimal" are used interchangeably throughout herein, and one skilled in the relevant art(s) will appreciate that a best or optimal access plan determined by query optimizer 165 is not necessarily an absolutely optimal access or query plan, but rather reflects an access plan determined by rules designed, implemented, or executed by query optimizer 165 to be the best plan of those access plans according to some objective or subjective criteria. Determined access plan 218 may then be utilized to manipulate data in tables 170.

In an example embodiment, functionality described herein with respect to query optimizer 165 may be implemented on, and with architecture associated with, relational database management system SAP SYBASE SQL ANYWHERE.

In an example embodiment, query optimizer 165 determines access plan 218 by dividing a query into one or more query blocks, where a query block comprises an atomic portion of a query. A subplan 200 is created for each query block.

In an example embodiment, subplan 200 is the smallest SQL table expression for which an optimization process is invoked one or more times. Subplan 200 may consist of a set of relations and/or other subplans. Query optimizer 165 functions to determine and select an optimization algorithm 151 to optimize subplan 200.

In an example embodiment, one or more subplans 200 may be created and processed (as described herein) for a given query.

In an example embodiment, query optimizer 165 selects an optimization algorithm 151 to optimize a subplan 200. In an example embodiment, selection of an appropriate optimization algorithm 151 involves evaluation of dimensions such as, for example, the complexity of the subplan (e.g., in terms of semantic richness), how "expensive" the subplan is (e.g., cost of execution), any correlation between complexity and cost, and/or resources (e.g., CPU time, memory).

In an example embodiment, during query optimization, query optimizer 165 uses the selected algorithm to generate or enumerate a series of alternative access plans, estimate the execution cost of each, and determine the access plan having the lowest or most optimal cost. An assumption of this approach is that increasing the set of feasible plans enumerated by an algorithm improves the chances of finding a better access plan. However, this is not always the case. Also, various environments may not tolerate large scale enumeration (e.g., mobile devices), as increasing enumeration increases the compile-time of optimization and may require more resources than may be available.

Thus, a problem in query optimizer design is how to determine and select the best algorithm before enumerating, while still taking into account dimensions and properties such as, for example, complexity, cost, and/or available resources. As a corollary, determining complexity (e.g., as a function of the amount of enumeration) for a random query has heretofore been an intractable problem, at least with respect to providing a pre-enumeration evaluation of complexity in the context of resource estimation for a query optimization process, technological solutions to which are described throughout herein.

In an example embodiment, query optimizer 165 selects an algorithm from a set or pool of optimization algorithms 151 stored in memory 150. Optimization algorithms 151 may possess diverse profiles, characteristics, and/or properties related to, for example, the search space generated, resource requirements, the nature of queries an algorithm is designed to optimize, the quality of the resulting access plan, and/or the implementation of logical enumeration, physical plan generation, and/or cost-based and logical pruning. These properties, and others, may affect and/or determine resource consumption, as well as impact the quality of resulting access plan 218. One having skill in the relevant art(s) would understand that the above considerations are presented by way of example, not of limitation, and that other factors may be considered when query optimizer 165 selects an optimization algorithm 151 based on properties or characteristics.

Figure 2:
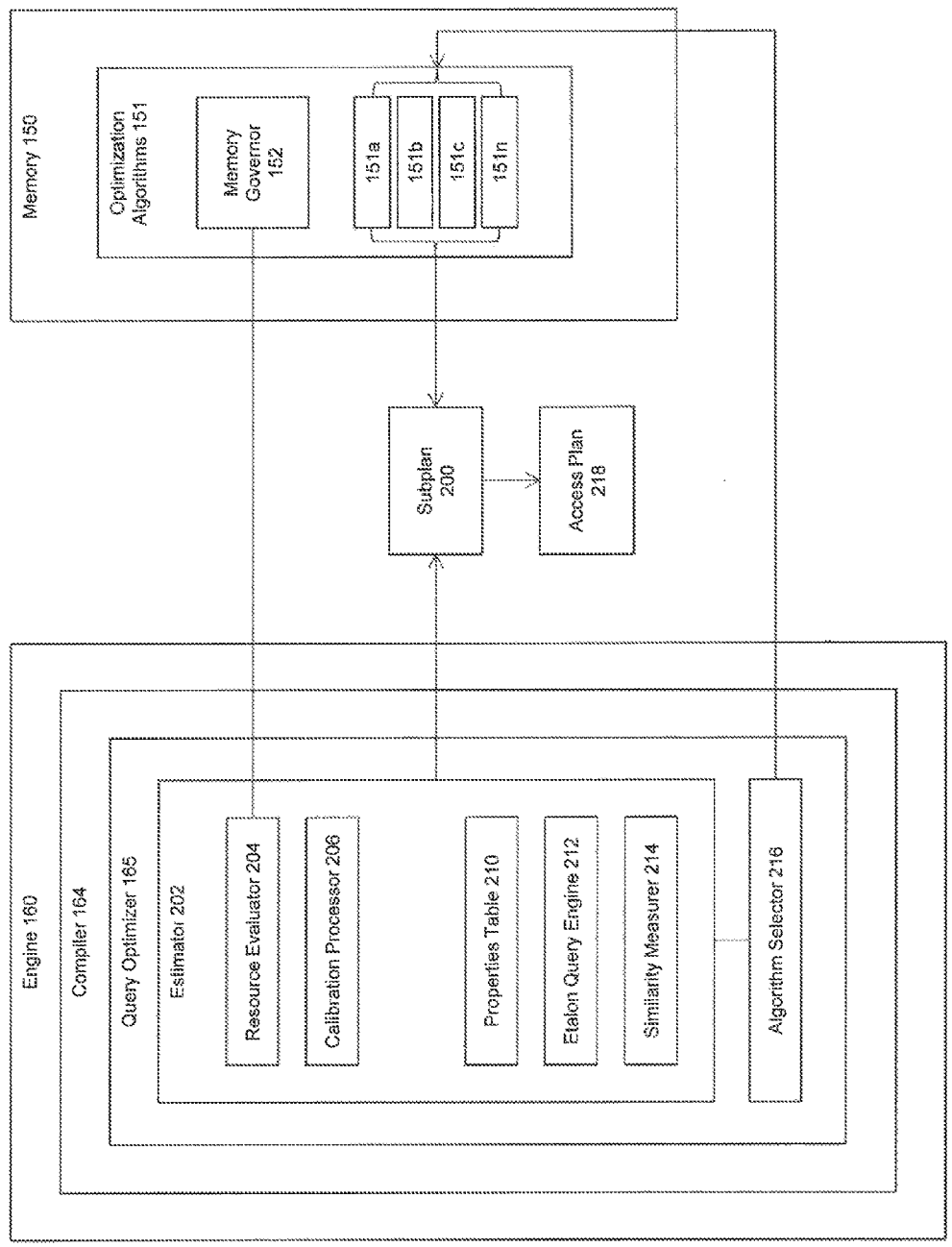
FIG. 2 is a detailed block diagram of the system of FIG. 1 showing a query optimizer and a memory, according to an example embodiment.

In an example embodiment, query optimizer 165 selects an algorithm from one of optimization algorithms 151, executing the selection via an algorithm selector 216, shown in FIG. 2. Query optimizer 165 generates an access plan 218 using the selected algorithm.

In an example embodiment, optimization algorithms 151 share a common internal representation of queries, such as a normalized join operator tree, data structures, such as, a memorization table, special memory heaps, one or more cost models, etc. It may thus be possible to analyze and compare performance between optimization algorithms 151. For example, in SAP Sybase SQL Anywhere statistics regarding the optimization process may be logged, reported, and visualized for purposes of comparison, for example, with respect to a description of the search space (e.g., physical plans considered, pruning decisions), optimization time breakdown, and memory usage for the various subphases.

In an example embodiment, properties may be calculated, determined, and/or pre-computed for each optimization algorithm 151 prior to query optimizer 165 selecting an algorithm to generate an optimal access plan for subplan 200. In an example embodiment, properties associated with any one of optimization algorithms 151 may be known and/or pre-computed, and/or may be dynamically processed, estimated, and/or determined using a calibration process, performed by, for example, a calibration processor 206 to estimate different properties such as, for example, the CPU time and/or the memory required to generate an access plan using each optimization algorithm 151. One skilled in the relevant art(s) will appreciate that properties are not limited to these examples and may generally be defined as any quality, trait, characteristic, or metric associated with, for example, an optimization algorithm 151. By way of example, not of limitation, properties may include implementation-specific statistics such as the observed sizes of different structures used by an optimization algorithm 151, or the numbers of generated access plans of a certain shape (e.g., how many left-deep plans generated or proper bushy plans generated).

In an example embodiment, once an optimization algorithm 151 is selected by query optimizer 165, a code generator 163, located in and/or otherwise communicatively coupled to a compiler 164, translates access plan 218 generated by query optimizer 165 into an executable form. Access plans 218 may then be executed by an execution unit 166 using access methods 168, as shown in FIG. 1.

In an example embodiment, query optimizer 165 selects an algorithm from among optimization algorithms 151. One of optimization algorithms 151 may be a backtracking algorithm without memorization over the left deep tree access plans such as 151a. Another one of optimization algorithms 151 may be a backtracking algorithm with memorization over the left deep tree access plans such as 151b. Another one of optimization algorithms 151 may be a dynamic programming algorithm over the bushy tree access plans such as 151c. Other algorithms could alternatively be used.

In an embodiment, the backtracking algorithm without memorization over the left-deep tree access plans 151a is a relatively inexpensive algorithm in terms of server's 130 resources and manner of utilization. The backtracking algorithm without memorization over the left-deep tree access plans 151a may be intensive in terms of CPU consumption for server 130, but may also not utilize a great deal of system memory 150. Backtracking algorithm without memorization over the left-deep tree access plans 151a is capable of generating access plans 218 for subplans 200 while still avoiding brute force methods.

In an example embodiment, backtracking algorithm with memorization over the left deep tree access plans 151b is relatively less intensive in terms of CPU consumption, but may utilize more memory 150 than algorithm 151a.

In an example embodiment, of the example optimization algorithms 151 discussed herein, the bottom up dynamic programming algorithm with memorization over bushy-tree access plans 151c is considered relatively the most intensive in terms of CPU usage and memory utilization. Bottom up dynamic programming algorithm with memorization over bushy-tree access plans 151c may determine a better access plan 218 for subplan 200 than algorithms 151a and 151b. Unlike backtracking algorithm without memorization 151a, however, bottom up dynamic programming algorithm with memorization over bushy-tree access plans 151c runs to completion prior to generating access plan 218. Therefore, in an example system where CPU consumption is high and/or memory is limited, dynamic programming algorithm with memorization over bushy-tree access plans 151c may run out of resources and fail to run to completion. As a result, algorithm 151c may fail to generate access plan 218 and thus fail to achieve optimization. In an example embodiment, at least one optimization algorithm 151 is capable of generating access plan 218 for any and all subplans 200 without denying a query or resorting to brute force methods.

Optimization algorithms 151, as discussed herein, are presented for the purpose of illustration, not limitation, and one skilled in the relevant art(s) would appreciate that various other algorithms may be stored in memory 150 and used by query optimizer 165. Embodiments may use any query optimization algorithm known or later developed, represented in FIG. 1 as 151*n*, whose properties in a particular environment, for example, with respect to CPU consumption and memory use, may be known, pre-computed, and/or estimated as described throughout herein, for example, using calibration processor 206.

By way of explanation, not limitation, memorization is an optimization technique known to one skilled in the relevant art(s) where the inputs and outputs of function calls are saved in system memory 150. Because the inputs and outputs of the function call are saved, the server avoids processing the function with the same inputs more than once and retrieves an output that is stored in memory 150. As a result, server 130 may be able to redirect CPU time to other functions or processes.

(B) Determining Available Resources and Evaluating Cost

Different optimization algorithms 151 may perform better or may be better suited to perform optimally in, for example, particular environments, with particular types of queries, and/or under particular circumstances. For example, optimization algorithms 151 may be varied in terms of their relative advantages, performance, and/or functionality, so that collectively optimization algorithms 151 perform effectively across a wide range of varied environments. For example, SAP SYBASE SQL ANYWHERE OPTIMIZER possesses a broad set of optimization algorithms 151 with diverse properties related to, for example, the search space generated as well as how logical enumeration, physical plan generation, and cost-based and logical pruning are implemented. These properties in turn may impact resource consumption as well as the quality of the best plan generated by each algorithm.

In an example embodiment, an estimator 202 analyzes performance measures and properties associated with optimization algorithms 151.

In an example embodiment, in the process of selecting an optimization algorithm 151 for subplan 200, query optimizer 165 analyzes factors such as, but not limited to, inherent characteristics of subplan 200, the properties of each optimization algorithm 151, current state of server 130, and/or available system resources, as well as information which may be indexed and/or stored (e.g., for comparison) in a properties table 210, and accessible to estimator 202.

In an example embodiment, estimator 202 assesses available resources for DBMS 140 by determining, for example, available memory 150 and CPU time. In the process of determining available resources for DBMS 140, estimator 202 may receive and/or collect information which may be stored in properties table 210 using a resource evaluator 204, which is operable to store and process system capacity and availability information.

In an example embodiment, availability of system resources depends on various factors and circumstances. For example, different platforms hosting DBMS 140 may have different configurations. In another example, the resources available to DBMS 140 vary as other applications that share the same platform consume some or most of the resources.

In an example embodiment, even if resources available to DBMS 140 remain constant, those resources may vary with the number of parallel requests DBMS 140 processes in addition to determining access plan 218 and optimizing the query. These factors may have a direct or indirect impact on available memory and CPU time. One having skill in the relevant art(s) would understand that more factors than those described herein may impact the availability of resources in DBMS 140 and such factors are contemplated as estimable by application of the functionality associated with resource evaluator 204.

In an example embodiment, DBMS 140 includes a memory governor 152 which is operable to allocate memory. Memory governor 152 determines the amount of memory available for a particular process, such as query optimization. Memory governor 152 may determine the amount of available memory based on the current state of server 130. For example, the amount of memory available on a handheld device may be different than the amount of memory and CPU time available on server-class installations, cloud, or virtual server environments possessing large amounts of memory and/or CPU time. However, if server 130 is already executing a memory intensive process, a limited amount of memory may be available for a query optimization process. Thus, depending on the type and/or the state of server 130, estimator 202 may identify, according to information (e.g., in the form of outputs) provided by resource evaluator 204, a different optimization algorithm 151 to optimize the same subplan 200, depending on the configuration, environment, and/or state of server 130, DBMS 140, and/or allocations of memory set by memory governor 152.

By way of example, not of limitation, resource evaluator 204 may analyze system resources available for the optimization process compared with the amount of, or general degree of, resources required by optimization algorithm 151 to optimize subplan 200. For example, if server 130 has sufficient memory 150 and CPU time to satisfy requirements of all algorithms of optimization algorithms 151, then query optimizer 165 may select a relatively more expensive algorithm such as algorithm 151*c* to optimize subplan 200. By contrast, if there is only enough memory to optimize subplan 200 with algorithms 151*a* or 151*b*, but not algorithm 151*c*, query optimizer 165 may optimize using an optimization algorithm 151 requiring a relatively less amount of CPU time or memory 150.

In an example embodiment, where, for example, server 130 is busy and memory 150 is scarce, query optimizer 165 may default to optimizing subplan 200 with algorithm 151*a* which utilizes relatively less system resources. Such a default selection may proceed even if algorithm 151*a* was initially determined to be too expensive.

In an example embodiment, the current state of server 130 is a factor assessed by resource evaluator 204 in providing criteria for determining which optimization algorithm 151 query optimizer 165 will select. A current state of server 130 may be used to estimate the amount of CPU time query optimizer 165 will need to optimize subplan 200 using a particular optimization algorithm 151. For example, an algorithm capable of determining an optimal access plan for subplan 200 on a "busy" server 130 may not be the best choice when server 130 is free and more robust algorithms such as, for example, 151*c* exist.

In an example embodiment, algorithm 151*c* uses more than one CPU in parallel to execute subtasks for determining access plan 218, thus requiring less overall time. In an example embodiment, algorithms 151*a* and 151*b* do not execute subtasks in parallel, and instead use only a single CPU, thus requiring relatively more overall time. In an example embodiment, CPU time is measured in microseconds.

In an embodiment, DBMS 140 uses a calibration process, enabled by a calibration processor 206, to estimate the CPU time and/or memory required to generate access plan 218 using each optimization algorithm 151 for subplan 200.

In an example embodiment, calibration processor 206 estimates, for example, the CPU time needed to generate access plan 218 using a particular optimization algorithm 151. CPU time is estimated as cost per unit of work. A unit of work is the CPU time each optimization algorithm 151 requires to process one node in subplan 200 using a given optimization process. Calibration processing takes into account hardware hosting DBMS 140 (e.g., server-class installation, mobile device). To estimate the cost per unit of work for one or more optimization algorithms 151, calibration processor 206 executes a subplan with predefined workload units. Calibration processor 206 optimizes the subplan with an optimization algorithm 151 and records the elapsed time. The elapsed time is then divided by a predefined number of workload units. Thus, a cost per unit of work for each optimization algorithm 151 is determined as a measure of CPU time.

In an example embodiment, calibration processor 206 also calculates the cost per unit of work for different types of queries to determine a better approximation of the CPU time required for different queries.

In an example embodiment, the amount of memory required by each optimization algorithm 151 to determine access plan 218 is estimated by the size of a memorization table built by each optimization algorithm 151. The memory is estimated for algorithms using memorization. One having skill in the relevant art(s) would understand that each entry in a memorization table represents a saved partial access plan that maybe be used to generate access plan 218 for subplan 200. For example, in an example embodiment, algorithm 151*b* saves the partial access plan cost that is the best cost estimate for a subset of quantifiers. Thus, for example, for subplan 200 with N quantifiers, optimization algorithm 151 needs a maximum memory space that is equal to $2^N * size$ (an entry in the memorization table). One having skill in the relevant art(s) will understand that other formulations are possible to estimate the amount of memory required.

In an example embodiment, optimization time is considered by estimator 202 in the process of estimating performance, as a property of optimization algorithms 151. For example, optimization time breakdown measures the time expended for operations related to, for example, the logical enumeration phase (LEP) (e.g., enumerating logical partitions, memorization table management), plan generation phase (PGP) (e.g., building physical plans, costing, pruning, saving plans in the memorization table), as well as miscellaneous times such as obtaining initial upper bound, initializing the optimizer structures, partition management, and/or clean up time.

Quantifying particular subphases of the optimization process allows for logging of detailed measurements which may be used to analyze the effect of a modification to query optimization (e.g., a change which improves the CPU time for the plan generation phase but increases overall memory consumption). Measurement further allows for analysis of the differences between optimization algorithms 151 for particular queries (e.g., types or classes of queries). Measurement further allows for collection of detailed statistics related to the optimization process, which may be used in estimating the resource consumption of current queries. One goal of detailed measurement, for example, with respect to resource consumption is to determine which operation(s) of the query optimization process depend on query topology, and which operations depend mostly on the current state of DBMS 140, server 130, or memory 150 (e.g., table sizes, column statistics, buffer pool size).

In an example embodiment, experimental results derived from actual optimization time breakdown, memory consumption, and estimated run-time cost may provide information regarding the optimization process. For example, experimental observations may show that the enumeration phase reflects 5%-15% of the total optimization time and, by contrast, that plan generation (e.g., including costing and pruning of physical plans) may actually be more expensive then the logical enumeration phase.

By way of example, not of limitation, in SAP SYBASE SQL ANYWHERE, statistics about the optimization process may be logged and include description of the actual search space (e.g., all physical plans considered, pruning decisions), as well as optimization time break down, and memory usage for particular subphases. Such logged characteristics, as well as associated statistics for random and/or current queries may be stored and/or processed.

In an example embodiment, measurements related to quantifying subphases of the optimization process using optimization algorithms 151, including detailed statistics and metrics associated with resource consumption, may be indexed and stored in properties table 210. As described herein, performance related information relevant to resource estimation and algorithm selection performed by estimator 202, as well as information logged regarding the performance of optimization algorithms 151 on specific queries and/or properties associated with known or characterized measures of algorithm performance, for example, with respect to query types, may be indexed and/or stored in properties table 210. Query optimizer 165 may refer to information stored in properties table 210 when comparing optimization algorithms 151 during the pre-enumeration phase of optimization. Information stored in properties table 210 is not limited to current state or optimization processing information for current queries. For example, properties table 210 may store externally-derived, known, pre-computed, and/or previously characterized query optimization process information. Information stored in properties table 210 may be pre-loaded, updated, supplemented, and/or dynamically generated, for example, using calibration processor 206. Information stored in properties table 210 may be organized, categorized, encoded, and/or analyzed by any method(s) suitable for analyzing such data.

(C) Dynamic Resource Estimation Using Similarity Measures

In an example embodiment, subplan complexity is considered by estimator 202 in the process of estimating performance of an optimization algorithm 151. In the process of determining the complexity of subplan 200, estimator 202 evaluates various properties of a hypergraph associated with subplan 200.

In an example embodiment, a hypergraph, or query graph, for a particular subplan 200 is built by executing a simplification algorithm on a simple, undirected graph representation of subplan 200. The characteristics of subplan 200 are evaluated by analyzing the algebraic properties of the resulting hypergraph. One skilled in the relevant art(s) would understand that the characteristics of a hypergraph, such as, for example, its shape and size, may be indicative or reflective of the size of the search space for a subplan 200. For example, an estimation of memory consumption based on dynamic programming with memorization may be reflected by the number of connected subgraphs, which dictates the size of the memorization table built during join enumeration.

In analyzing characteristics of a hypergraph, where vertices correspond to subplan quantifiers and hyperedges correspond to predicates between the quantifiers as defined in subplan 200, one skilled in the relevant art(s) will understand the need to approximate the number of subtrees to be saved in a memorization table in memory 150 and/or to be enumerated by the CPU. The number of subtrees saved in the memorization table may thus correspond to the amount of system memory 150 that must be allocated to optimize subplan 200 using, for example, memorization algorithms 151b and 151c. The number of subtrees that must be enumerated may also be indicative of the CPU consumption that server 130 requires to optimize subplan 200. For example, an algorithm which divides optimization into two or more phases (e.g., enumeration phase and the physical plan generation phase) may utilize extra memory for any logical partition management. The amount of extra memory may thus depend on the number of enumerated logical partitions. CPU consumption may also be related to the number of connected subgraphs and the number of enumerated logical partitions. However, determining the number of connected subgraphs for a random query, prior to enumeration, has heretofore been an intractable problem, at least in the sense that, unless and until all connected subgraphs and pairs are enumerated, these numbers cannot be determined. One having skill in the relevant art(s) would recognized a long felt need to be able to estimate these values for a random query prior to enumerating, since various environments may not tolerate intensive enumeration (e.g., mobile devices), as increasing enumeration increases the total runtime of the query and consuming more resources.

One solution to this problem is to estimate the memory use and CPU consumption of a query optimization process based on statistics related to the resource consumption of a set of "etalon queries" for which the performance is known, determining if a hypergraph associated with a subplan 200 is "close" or similar to a known etalon query optimized by one of optimization algorithms 151, and predicting that it will have resource consumption and optimization performance "close" to the statistics of the etalon query when optimized by the same optimization algorithm 151. In an example embodiment, the above described estimation process is used by query optimizer 165 to select an optimization algorithm 151 based on resources available to query optimizer 165 given the current state of DBMS 140, for example, as assessed by resource evaluator 204 (e.g., if server 130 is very busy and/or has low amounts of available memory 150).

In an example embodiment, estimator 202 determines if a hypergraph of a current subplan 200 is close, based on a similarity measure, to an etalon query of known performance. An etalon query may be, for example, chain, cycle, star, grid, or clique.

In an example embodiment, estimating performance and predicting optimization time and memory consumption for a random query is performed by comparing similarity distances between a hypergraph of subplan 200 and a pool of etalon queries with known performance. Etalon queries are processed and/or made accessible to estimator 202 by an etalon query engine 212. A set of etalon queries may be constructed, for example, using a calibration process, as performed by calibration processor 206, wherein each optimization algorithm 151 is run for each etalon query and optimization statistics related to resource consumption are saved in properties table 210. Information processed by etalon query engine 212 and/or stored in properties table 210 for each etalon query includes the degree sequence used for calculating an etalon similarity measure and a set of statistics for each optimization algorithm 151 such as, for example, CPU and memory consumption which may be recorded when the etalon query was optimized by optimization algorithm 151.

In an example embodiment, during the ordinary operations of DBMS 140, queries may be added to the set of etalon queries after being optimized, for example, as processed by etalon query engine 212 and stored in properties table 210. In this manner, the set of etalon queries is increased and cultivated, subject to any limitations, such as, for example, on duplication, storage, and/or restrictions enforced by etalon query engine 212.

By way of example, not of limitation, where for a current query Q it is determined that the hypergraph for its subplan 200 is close to an etalon query $e_Q$, whose optimization performance by optimization algorithm 151 is known, then Q, when optimized by a same optimization algorithm 151, will be deemed to have resource consumption requirements close to the optimization statistics of $e_Q$. In an example embodiment, determining whether Q is close or similar to $e_Q$ for purposes of estimating resource consumption is determined by measuring the "similarity" between their respective hypergraphs. A similarity measure between two or more hypergraphs is used to establish upper bounds for graph invariants (e.g., graphs share a particular property if the corresponding similarity measure between them is high). The similarity measure thus provides an upper bound of the size of the maximum common edge subgraph between two or more hypergraphs.

For example, let $Q=(V^Q, E^Q)$ be a subplan 200 hypergraph with $|V^Q|=N$ tables where $V^Q=\{v_1^Q, \ldots, v_N^Q\}$. The degree of d(v) of the vertex v is the number of vertices connected to v. Vertices in the set $V^Q$ are sorted in non-increasing order of degree, $d(v_k^Q) \geq d(v_k^Q+1)$, for all $1 \leq k < N$: $(d(v_1^Q), \ldots, d(v_N^Q))$, herein referred to as the degree sequence of the query Q. The esim(Q, X) etalon similarity measure between $Q=(V^Q, E^Q)$ and an etalon query X, represented only by its degree sequence $(d(v_1^X), \ldots, d(v_N^X))$, is:

$$E(Q, X) = \left\lfloor \frac{1}{2} \times \sum_{i=1,N} \left(\min(d(v_i^Q), d(v_i^X))\right) \right\rfloor$$

$$esim(Q, X) = \frac{(N + E(Q, X))^2}{(N + |E^Q|)\left(N + \left\lfloor \frac{1}{2} \times \sum_{1 \leq j \leq N} d(v_i^X) \right\rfloor\right)}$$

In an example embodiment, for random query $Q=(V^Q, E^Q)$ with $|V^Q|=N$ tables, its etalon query $e_Q$ is chosen, from the etalon queries of size N, to be:

$$esim(Q, e_Q) = \max_{\{Y | Y \in \epsilon, |V^Y_i|=N\}} esim(Q, Y)$$

In an example embodiment, if $e_Q$ is defined as above, the number of the connected subgraphs and the number of pairs of the hypergraph Q are closely related, such that $(Q) \sim (e_Q)$. This relationship may be demonstrated experimentally, for example, by randomly generating benchmark queries and comparing actual performance measures.

Figure 3:
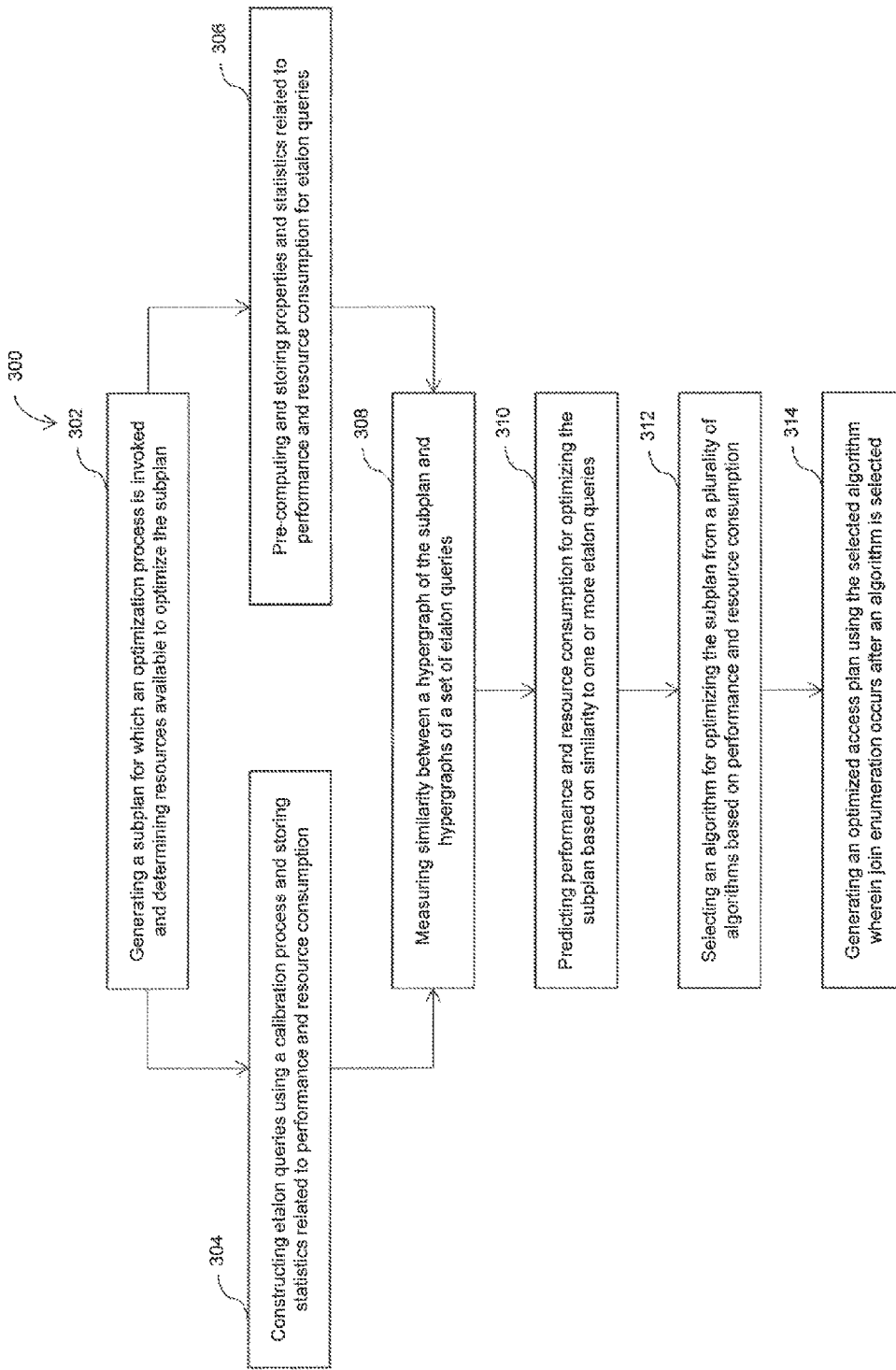
FIG. 3 is a flowchart illustrating a process for performing resource estimation for query optimization, according to an example embodiment.

FIG. 3 is a flow diagram illustrating a method for performing resource estimation for query optimization, according to an example embodiment.

Method 300 begins at step 302, when a subplan for which an optimization process is invoked is generated and resources available to optimize the subplan are determined.

In an example embodiment, in step 302, query optimizer 165 divides a query into one or more query blocks and a subplan 200 is created for each query block.

In an example embodiment, estimator 202 assesses available resources for DBMS 140 by determining available memory 150 and CPU time. In the process of determining available resources for DBMS 140, estimator 202 receives and/or collects information stored in properties table 210 using resource evaluator 204, which is operable to store and process system capacity and availability information.

In an example embodiment, memory governor 152 determines and/or allocates an amount of memory 150 available to perform query optimization. Memory governor 152 determines available memory based on the current state of server 130.

In an example embodiment, the current state of server 130 is assessed by resource evaluator 204 and provided as criteria for determining which optimization algorithm 151 query optimizer 165 should select. The current state of server 130 is used to estimate the amount of CPU time query optimizer 165 will need to optimize subplan 200.

At step 304, one or more etalon queries are constructed using a calibration process and statistics related to performance and resource consumption are stored.

In an example embodiment, in step 304, DBMS 140 uses a calibration process, enabled by calibration processor 206, to estimate the CPU time and/or memory required to generate access plan 218 using each optimization algorithm 151 for subplan 200.

In an example embodiment, calibration processor 206 estimates CPU time needed to generate access plan 218 using optimization algorithm 151. CPU time is estimated as cost per unit of work. Calibration processing takes into account hardware hosting DBMS 140 (e.g., server-class installation, mobile device).

In an example embodiment, calibration processor 206 calculates the cost per unit of work for different types of queries to determine an approximation of the CPU time required for different queries.

At step 306, various properties and statistics related to performance and resource consumption for etalon queries are pre-computing and stored.

In an example embodiment, during the regular operation of DBMS 140, queries may be added to the set of etalon queries after being optimized, for example, as processed by etalon query engine 212 and stored in properties table 210. The set of etalon queries is increased and cultivated, subject to any limitations, such as, for example, on duplication, storage, and/or restrictions enforced by etalon query engine 212.

In an example embodiment, properties and statistics related to performance and resource consumption for etalon queries are calculated, determined, and/or pre-computed for each optimization algorithm 151 prior to query optimizer 165 selecting an algorithm to generate an access plan 218 for subplan 200.

In an example embodiment, properties associated with an optimization algorithm 151 are known and/or pre-computed and stored in properties table 210.

In an example embodiment, measurements related to quantifying subphases of the optimization process using optimization algorithms 151, including detailed statistics and metrics associated with resource estimation, are stored in properties table 210.

In an example embodiment, query optimizer 165 refers to properties and statistics related to performance and resource consumption for etalon queries stored in properties table 210 when comparing optimization algorithms 151 during the pre-enumeration phase of optimization.

At step 308, a hypergraph of the subplan is generated and similarity between the hypergraph of the subplan and a set of etalon queries is measured.

In an example embodiment, in step 308, subplan complexity is considered by estimator 202 in the process of estimating performance of an optimization algorithm 151. In determining the complexity of subplan 200, estimator 202 evaluates various properties of a hypergraph associated with subplan 200.

In an example embodiment, a hypergraph, or query graph, for a particular subplan 200 is built by executing a simplification algorithm on a simple, undirected graph representation of subplan 200. The characteristics of subplan 200 are evaluated by analyzing the algebraic properties of the resulting hypergraph.

At step 310, performance and resource consumption for optimizing the subplan based on similarity to one or more etalon queries is predicted.

In an example embodiment, in step 310, estimator 202 determines if a hypergraph of subplan 200 is close, based on a similarity measure, to one or more etalon queries of known performance. Predicting optimization time and memory consumption for a random query is performed by comparing similarity distances between a hypergraph of subplan 200 and the hypergraphs of a set of etalon queries. Etalon queries are processed and/or made accessible to estimator 202 by etalon query engine 212. Information processed by etalon query engine 212 and/or stored in properties table 210 for each etalon query includes a degree sequence used for calculating an etalon similarity measure in addition to a set of statistics for each optimization algorithm 151 such as, for example, CPU and memory consumption which may be obtained when the etalon query was optimized by optimization algorithm 151.

At step 312, an algorithm for optimizing the subplan is selected from a plurality of algorithms based on performance and resource consumption.

In an example embodiment, in step 312, the above described estimation process is used by query optimizer 165 to select an optimization algorithm 151 based on resources available to query optimizer 165 given a current state of DBMS 140 assessed by resource evaluator 204.

In an example embodiment, in the process of selecting an optimization algorithm 151 for subplan 200, query optimizer 165 analyzes factors such as inherent characteristics of subplan 200, the properties of each optimization algorithm 151, current state of server 130, and/or available system resources, any information related to which may be indexed and/or stored (e.g., for comparison) in a properties table 210, accessible to estimator 202.

In an example embodiment, query optimizer 165 selects an optimization algorithm 151 to optimize subplan 200 after evaluating dimensions such as, complexity of the query (e.g., number of connected subgraphs), the expense or cost of execution, any correlation between complexity and cost, and available resources (e.g., CPU time, memory).

In an example embodiment, optimization time is considered by estimator 202 in the process of estimating performance, as a property of optimization algorithms 151.

At step 314, an optimized access plan using the selected algorithm is generated, wherein join enumeration occurs after an algorithm is selected.

In an example embodiment, in step 314, query optimizer 165 executes selection of an algorithm from one of optimization algorithms 151 using algorithm selector 216 and query optimizer 165 generates an access plan 218 using the selected algorithm.

(D) Example Computer System

Figure 4:
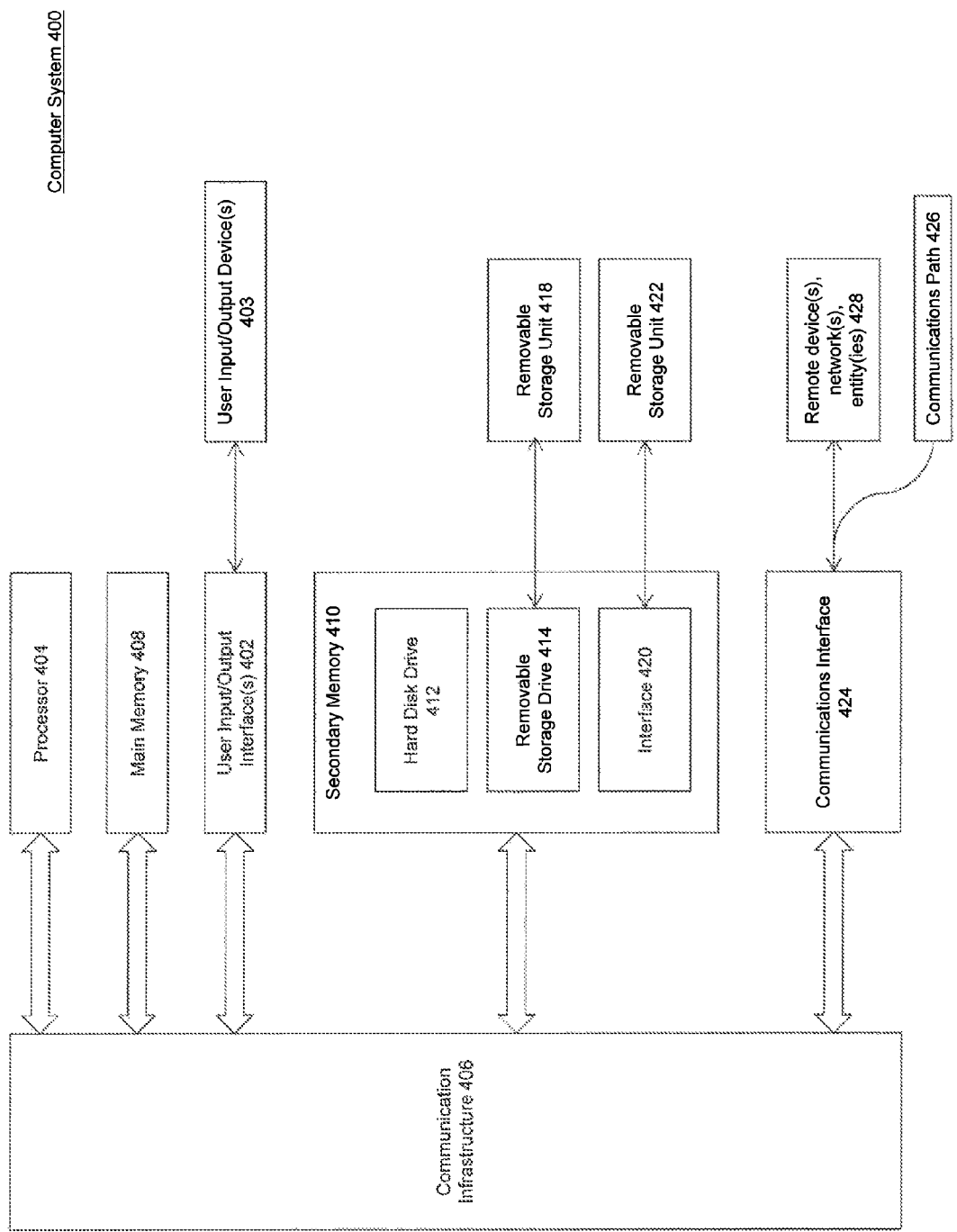
FIG. 4 is an example computer system useful for implementing various embodiments.

Various embodiments can be implemented, for example, using one or more well-known computer systems, such as computer system 400 shown in FIG. 4. Computer system 400 can be any well-known computer capable of performing the functions described herein, such as computers available from International Business Machines, Apple, Sun, HP, Dell, Sony, Toshiba, etc.

Computer system 400 includes one or more processors (also called central processing units, or CPUs), such as a processor 404. Processor 404 is connected to a communication infrastructure or bus 406.

Computer system 400 also includes user input/output device(s) 403, such as monitors, keyboards, pointing devices, etc., which communicate with communication infrastructure 406 through user input/output interface(s) 402.

Computer system 400 also includes a main or primary memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to an example embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 4. In particular, embodiments may operate with software, hardware, and/or operating system implementations other than those described herein.

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method for improving a query, comprising:
   generating a subplan;
   determining similarity between a hypergraph of the subplan and a hypergraph of an etalon query with known properties by calculating a similarity measure, the similarity measure indicating similarity between a number of connected subgraphs of a subplan hypergraph and an etalon query hypergraph, the hypergraph of the subplan comprising a vertex corresponding to a quantifier of the subplan;

predicting one or more properties of an algorithm available for improving the subplan based on the similarity measure;

selecting an algorithm from a plurality of algorithms available for improving the subplan;

generating an improved access plan using the selected algorithm; and storing a degree sequence used for calculating the similarity measure and a set of statistics for each algorithm of the plurality of algorithms as properties of one or more etalon queries.

2. The method of claim 1, further comprising:
constructing one or more etalon queries using a calibration process, wherein one or more improved algorithms are run for each etalon query and statistics related to one or more properties of each etalon query are stored in a table.

3. The method of claim 1, further comprising:
pre-computing and storing properties and statistics for one or more etalon queries.

4. The method of claim 1, further comprising:
selecting the etalon query with the highest similarity measure;
referring to the known properties of the selected etalon query; and
identifying an algorithm from a plurality of algorithms available for improving the subplan prior to join enumeration based on the known properties of the selected etalon query.

5. The method of claim 1, wherein the one or more properties include performance and resource consumption.

6. A system for improving a query, comprising:
a database management system;
a memory coupled to the database management system; and
at least one processor coupled to the memory and configured to:
generate a subplan;
determine similarity between a hypergraph of the subplan and a hypergraph of an etalon query with known properties by calculating a similarity measure, the similarity measure indicating similarity between a number of connected subgraphs of a subplan hypergraph and an etalon query hypergraph, the hypergraph of the subplan comprising a vertex corresponding to a quantifier of the subplan;
predict one or more properties of an algorithm available for improving the subplan based on the similarity measure;
select an algorithm from a plurality of algorithms available for improving the subplan;
generate an improved access plan using the selected algorithm; and
store a degree sequence used for calculating the similarity measure and a set of statistics for each algorithm of the plurality of algorithms as properties of one or more etalon queries.

7. The system of claim 6, the at least one processor further configured to:
construct one or more etalon queries using a calibration process, wherein one or more improved algorithms are run for each etalon query and statistics related to one or more properties of each etalon query are stored in a table.

8. The system of claim 6, the at least one processor further configured to:
pre-compute and store properties and statistics for one or more etalon queries.

9. The system of claim 6, the at least one processor further configured to:
select the etalon query with the highest similarity measure;
refer to the known properties of the selected etalon query; and
identify an algorithm from a plurality of algorithms available for improving the subplan prior to join enumeration based on the known properties of the selected etalon query.

10. The system of claim 6, wherein the one or more properties include performance and resource consumption.

11. A tangible computer-readable device having instructions stored thereon that, when executed by at least one computing device, causes the at least one computing device to perform operations comprising:
generating a subplan;
determining similarity between a hypergraph of the subplan and a hypergraph of an etalon query with known properties by calculating a similarity measure, the similarity measure indicating similarity between a number of connected subgraphs of a subplan hypergraph and an etalon query hypergraph, the hypergraph of the subplan comprising a vertex corresponding to a quantifier of the subplan;
predicting one or more properties of an algorithm available for improving the subplan based on the similarity measure;
selecting an algorithm from a plurality of algorithms available for improving the subplan;
generating an improved access plan using the selected algorithm; and
storing a degree sequence used for calculating the similarity measure and a set of statistics for each algorithm of the plurality of algorithms as properties of one or more etalon queries.

12. The computer-readable device of claim 11, the operations further comprising:
constructing one or more etalon queries using a calibration process, wherein one or more improved algorithms are run for each etalon query and statistics related to one or more properties of each etalon query are stored in a table.

13. The computer-readable device of claim 11, the operations further comprising:
pre-computing and storing properties and statistics for one or more etalon queries.

14. The computer-readable device of claim 11, the operations further comprising:
selecting the etalon query with the highest similarity measure;
referring to the known properties of the selected etalon query; and
identifying an algorithm from a plurality of algorithms available for improving the subplan prior to join enumeration based on the known properties of the selected etalon query.

15. The method of claim 1, wherein the hypergraph of the subplan comprises a hyperedge corresponding to predicates between quantifiers defined by the subplan.

* * * * *